United States Patent
Boudin et al.

(10) Patent No.: US 11,359,547 B1
(45) Date of Patent: Jun. 14, 2022

(54) SEAL ASSEMBLY BETWEEN A TRANSITION DUCT AND A FIRST STAGE VANE STRUCTURE

(71) Applicant: Siemens Energy Global GmbH & Co. KG, Bayern (DE)

(72) Inventors: Dustin C. Boudin, Belmont, NC (US); Jordan Metz, Charlotte, NC (US); Johan Hsu, Orlando, FL (US); Muzaffer Sutcu, Oviedo, FL (US); Robert H. Bartley, Oviedo, FL (US); Wojciech Dyszkiewicz, Winter Springs, FL (US)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 17/125,661

(22) Filed: Dec. 17, 2020

(51) Int. Cl.
*F02C 7/28* (2006.01)
*F02C 7/12* (2006.01)

(52) U.S. Cl.
CPC ............ *F02C 7/28* (2013.01); *F02C 7/12* (2013.01); *F05D 2240/12* (2013.01); *F05D 2240/55* (2013.01); *F05D 2250/231* (2013.01); *F05D 2250/232* (2013.01); *F05D 2260/20* (2013.01); *F05D 2260/31* (2013.01); *F05D 2300/175* (2013.01)

(58) Field of Classification Search
CPC ........ F01D 9/023; F01D 9/041; F01D 11/005; F01D 11/003; F01D 11/008; F01D 25/246; F01D 25/12; F01D 25/243; F01D 25/24; F04D 29/083; F05B 2230/606; F02C 7/28; F02C 7/12; F02C 7/18; F05D 2240/12; F05D 2240/11; F05D 2240/55; F05D 2240/57; F05D 2250/231; F05D 2250/232; F05D 2260/20; F05D 2260/31; F05D 2260/36; F05D 2300/175; F05D 2220/3219; F05D 2300/642

See application file for complete search history.

(56) References Cited

U.S. PATENT DOCUMENTS

| | | | | |
|---|---|---|---|---|
| 6,751,962 B1 * | 6/2004 | Kuwabara | ............... | F01D 9/023 60/752 |
| 6,860,108 B2 * | 3/2005 | Soechting | ............... | F01D 9/023 60/39.37 |
| 7,246,995 B2 * | 7/2007 | Zborovsky | ............... | F01D 9/023 415/137 |
| 2016/0273374 A1 * | 9/2016 | Mitchell | ............... | F01D 25/246 |
| 2017/0284670 A1 * | 10/2017 | Fujisawa | ................... | F23R 3/60 |
| 2018/0030841 A1 * | 2/2018 | Lang | ..................... | F01D 11/005 |

* cited by examiner

*Primary Examiner* — Eric J Zamora Alvarez

(57) ABSTRACT

A sealing assembly positioned between a first component having a first interface and a second component having a second interface is provided. The sealing assembly includes a flat bracket fixedly attached to the first interface to define an extension and a floating seal including a body portion, a first U-shaped channel arranged to engage the extension, and a second U-shaped channel inhibiting movement of the floating seal in an axial direction while allowing movement in a radial direction, and the second U-shaped channel allowing movement in the axial direction and inhibiting movement in the radial direction.

9 Claims, 6 Drawing Sheets

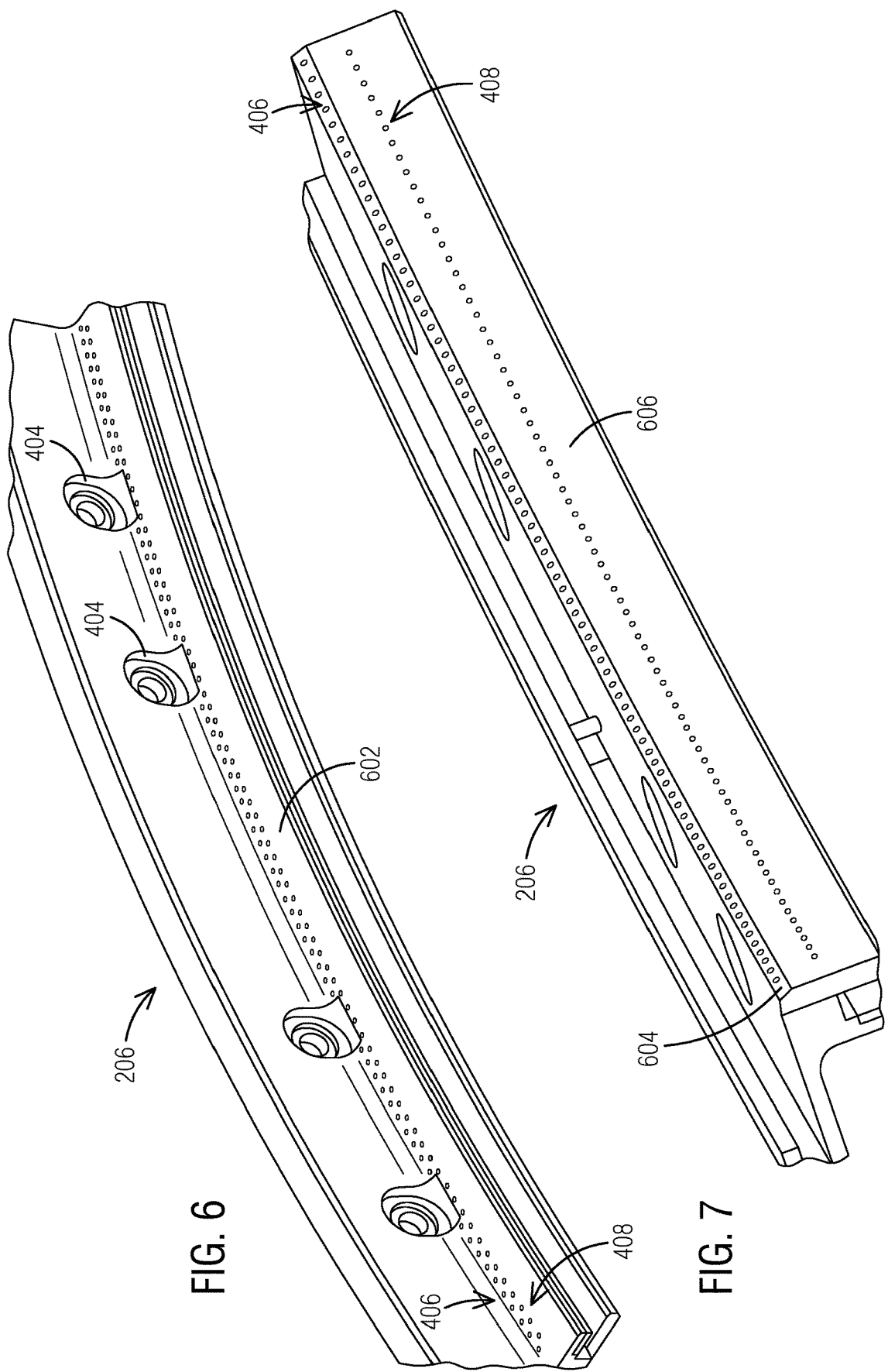

SEAL ASSEMBLY BETWEEN A TRANSITION DUCT AND A FIRST STAGE VANE STRUCTURE

BACKGROUND

A combustion turbine engine, such as a gas turbine engine, includes a compressor section, a combustor section, and a turbine section. Intake air is compressed in the compressor section and then mixed with fuel. The mixture is ignited in the combustor section to produce a high-temperature and high-pressure flow of combustion gases conveyed by a transition duct system to the turbine section of the engine, where thermal energy is converted to mechanical energy. Seals are interposed between respective outlets of the transition ducts and corresponding first stage turbine vane structures to limit compressed air, as may be fluidly coupled to a transition shell, to leak and mix with the hot flow of combustion.

BRIEF SUMMARY

In one construction, a sealing assembly positioned between a first component having a first interface and a second component having a second interface is provided. The sealing assembly includes a flat bracket fixedly attached to the first interface to define an extension and a floating seal including a body portion, a first U-shaped channel arranged to engage the extension, and a second U-shaped channel inhibiting movement of the floating seal in an axial direction while allowing movement in a radial direction, and the second U-shaped channel allowing movement in the axial direction and inhibiting movement in the radial direction.

In another construction, a method of cooling a sealing assembly is provided. The method includes attaching a flat bracket to a first component to define an extension, the bracket including a plurality of radial cooling channels, engaging a first U-shaped channel of a floating seal with the extension, the first U-shaped channel cooperating with the extension to inhibit relative axial movement therebetween while allowing relative radial movement, engaging a second U-shaped channel of the floating seal with a second component, the second U-shaped channel cooperating the second component to allow relative axial movement therebetween while inhibiting relative radial movement, discharging a first cooling flow from a first row of cooling passages formed in a frustoconical surface of the floating seal, discharging a second cooling flow from a second row of cooling passages formed in a cylindrical seal surface of the floating seal. The first row of cooling passages includes first outlet holes formed in the frustoconical surface and the second row of cooling passages include second outlet holes formed in the cylindrical surface.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 6 illustrates a top view of the floating seal.

FIG. 7 illustrates a bottom view of the floating seal.

DETAILED DESCRIPTION

A versatile sealing interface that can be retrofittable to existing transition ducts already in the field and fit within the tight clearance existing between the transition duct and a first stage turbine vane structure is desired.

Figure 1:
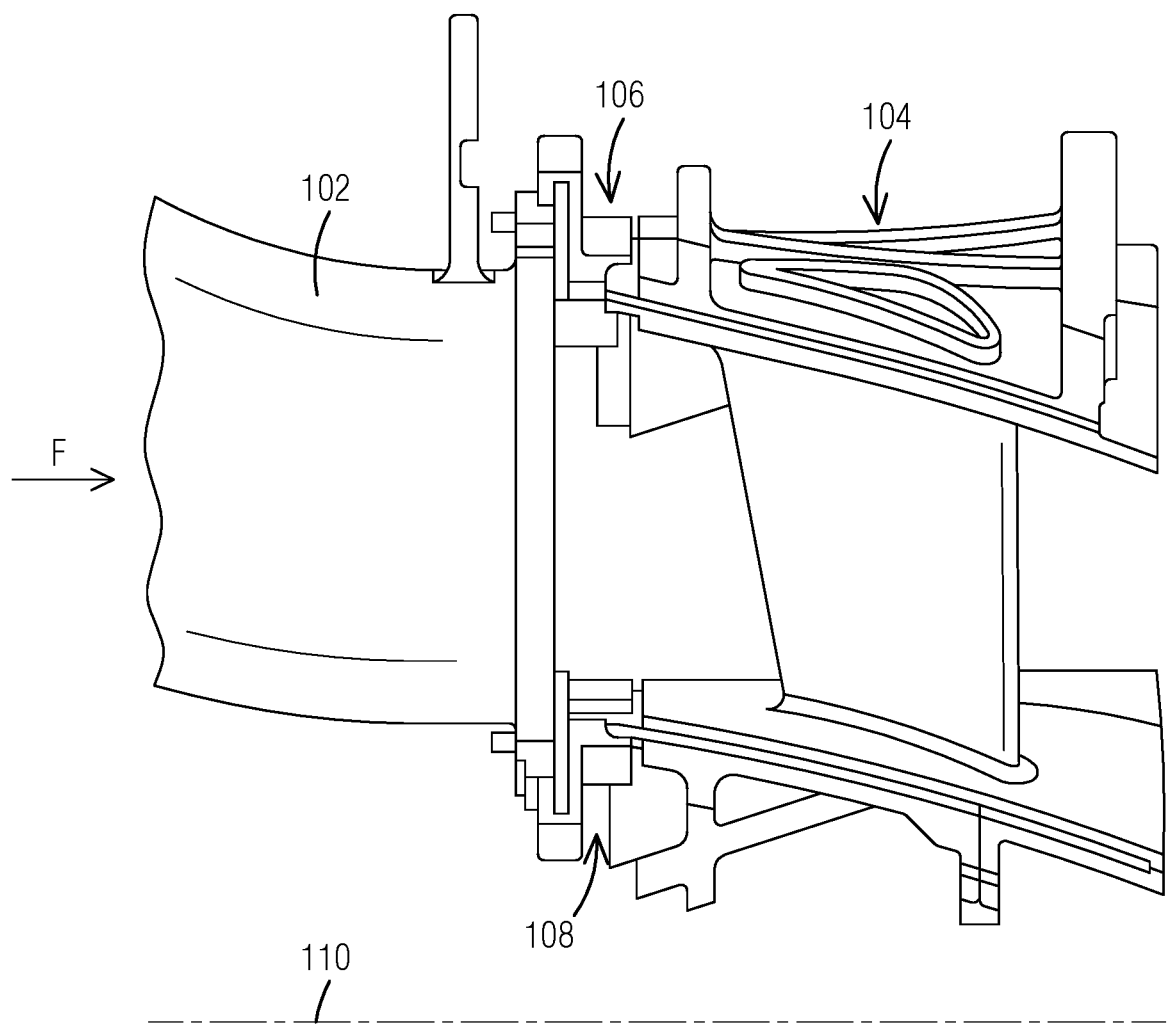
FIG. 1 illustrates a perspective view of a sealing interface between a transition component and a turbine component.

FIG. 1 illustrates a perspective view of a sealing interface between a gas turbine transition 102 and a first stage turbine vane 104. In FIG. 1, both the inner sealing interface 108 and the outer sealing interface 106 are shown for illustrative purposes. The outer sealing interface 106 is positioned radially outward from the inner sealing interface 108 with respect to a longitudinal axis 110 of the gas turbine engine about which axis the gas turbine engine rotates. The outer sealing interface 106 and the inner sealing interface 108 are essentially a mirror image of one another and thus henceforth will be referred to as the sealing interface. The sealing interface is arranged to seal a gap between the transition 102 and the first stage turbine vane 104. The transition 102 may include an outlet exit frame having an outlet exit surface 202 including at least one flange having a plurality of fastener holes. The flow path of the combustion gases is designated by F so that the flow of combustion gases flows from the combustor of the gas turbine engine through the transition 102 and into the turbine section of the engine represented in FIG. 1 by the first stage turbine vane 104.

Figure 2:
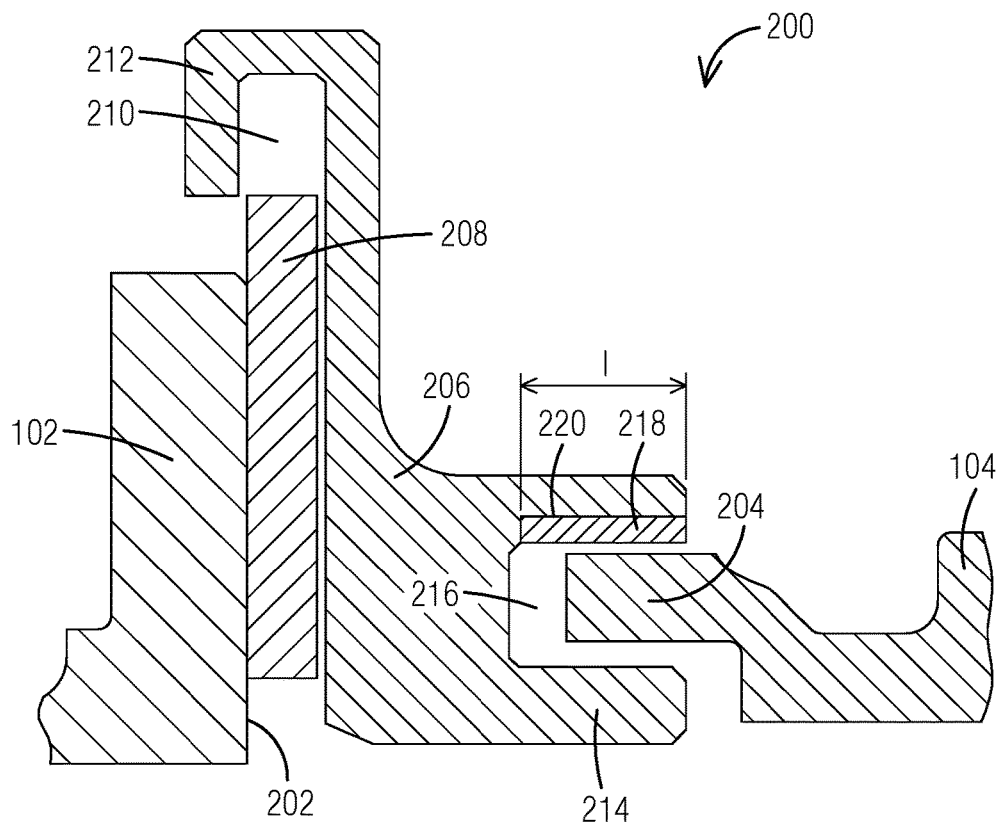
FIG. 2 illustrates a cross sectional view of a sealing interface between a transition component and a turbine component.

FIG. 2 illustrates a cross sectional view of the sealing interface 200 between the transition 102 and the first stage turbine vane 104. The transition 102 includes an outlet exit frame having an outlet exit surface 202. The first stage turbine vane 104 includes an upstream lip 204. The sealing interface 200 may be arranged to couple the outlet exit frame of the transition 102 to the first stage turbine vane 104.

As seen in FIG. 2, the sealing interface 200 includes a floating seal 206 having an upstream portion 212, a downstream portion 214, and a flat bracket 208 positioned between the transition 102 and the floating seal 206. The upstream portion 212 of the floating seal 206 is generally U-shaped in cross section and defines a first channel 210. The downstream portion 214 of the floating seal 206 is also generally U-shaped and is situated normal to the U-shaped upstream portion 212. The downstream portion 214 comprises a second channel 216 that engages the upstream lip 204 of the first stage turbine vane 104.

FIG. 2 illustrates the flat bracket 208 having a thickness and disposed between the upstream portion 212 of the floating seal 206 and the outlet exit surface 202. The flat bracket 208 may be fixedly attached to the transition 102 by a fastener, for example. The flat bracket 208 provides a barrier between the floating seal 206 and the transition 102 to eliminate any potential wear of the outlet exit surface 202. The flat bracket 208 also extends beyond the transition 102 to provide an extension. The first channel 210 is positioned to engage the flat bracket 208.

In an embodiment, the thickness of the flat bracket 208 may be in a range of between 6 mm and 25 mm. However, some considerations are taken into account when determining the thickness of the flat bracket 208. For example, the thickness of the flat bracket 208 is smaller than the width of the first channel 210 such that the floating seal 206 can move relative to the flat bracket 208. In addition, the thickness may be in the range of one to two times the wall thickness of the floating seal 206 measured at the first channel 210. In an embodiment, the gap clearance, i.e., the difference of the flat bracket thickness and the width of the first channel 210, is in a range of 0.4 mm to 2 mm.

To accommodate axial and radial movement of the first stage turbine vane 104 relative to the transition 102 during operation of the gas turbine, the floating seal 206 was designed to float, such that it can accommodate the movements of the first stage turbine vane 104 without coming into contact with any surrounding components or restraining any movement. For example, the first channel 210, when engaged with the flat bracket 208, inhibits movement of the floating seal 206 in the axial direction but allows movement in the radial direction and the second channel 216, when engaged with the first stage turbine vane 104, inhibits movement of the floating seal 206 in the radial direction but allows movement in the axial direction.

While designed to float, the floating seal 206 does still come into contact with the first stage turbine vane 104 at times. An outer contact face 220, with respect to the gas path, of the second channel 216 typically experiences significant wear from contact with the upstream lip 204 of the first stage turbine vane 104. A wear strip 218 is thus attached to the contact face 220 of the second channel 216. The wear strip 218 may extend a length (1) of the second channel 216, as shown. The width of the wear strip 218 is designed to accommodate vane twist that occurs from the thermal growth of the first stage turbine vane 104.

Figure 3:
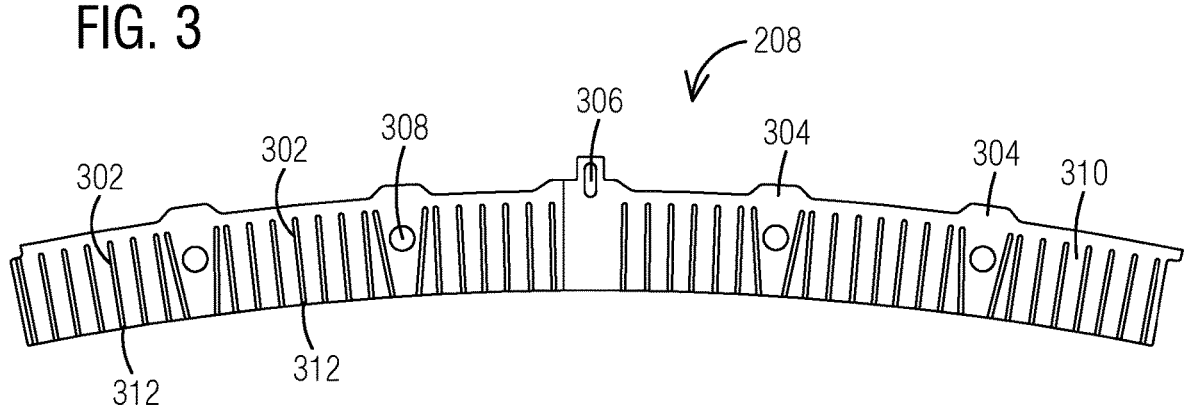
FIG. 3 illustrates a side view of a flat bracket.

FIG. 3 illustrates a side view of a face of an outer flat bracket. The inner flat bracket is generally a mirror image of the outer flat bracket. Thus, henceforth the inner flat bracket and the outer flat bracket will be referred to as the flat bracket 208. The flat bracket 208 includes a first planar face 310 and a second planar face (not shown). The first planar face 310 includes a plurality of cooling channels 302 extending radially. The plurality of cooling channels 302 provides cooling air from a compressor section to cool the outlet exit surface 202 of the transition 102. Some of the cooling channels 302 may be routed around mounting holes. Cooling channel outlets 312 may be equally spaced along the first planar face 310 for uniform cooling of the outlet exit surface 202.

In an embodiment, the flat bracket 208 includes a plurality of contact tabs 304. The contact tabs 304 are provided on an end of the flat bracket 208 that engages the floating seal 206 within the first channel 210. The contact tabs 304 are provided on the flat bracket 208 in order to reduce points of contact between the floating seal 206 and the flat bracket 208 and thus reduce potential binding of the floating seal 206. In an embodiment, a slot 306 is formed in the flat bracket 208 through which an anti-rotation pin may extend.

In an embodiment, the flat bracket 208 includes a plurality of bolt holes 308. A plurality of bolts may be used to attach the flat bracket 208 to the transition 102 through the plurality of bolt holes 308. During the attaching, the first planar face 310 is positioned to mate to the outlet exit surface 202 in order to cool the outlet exit surface 202.

Figure 4:
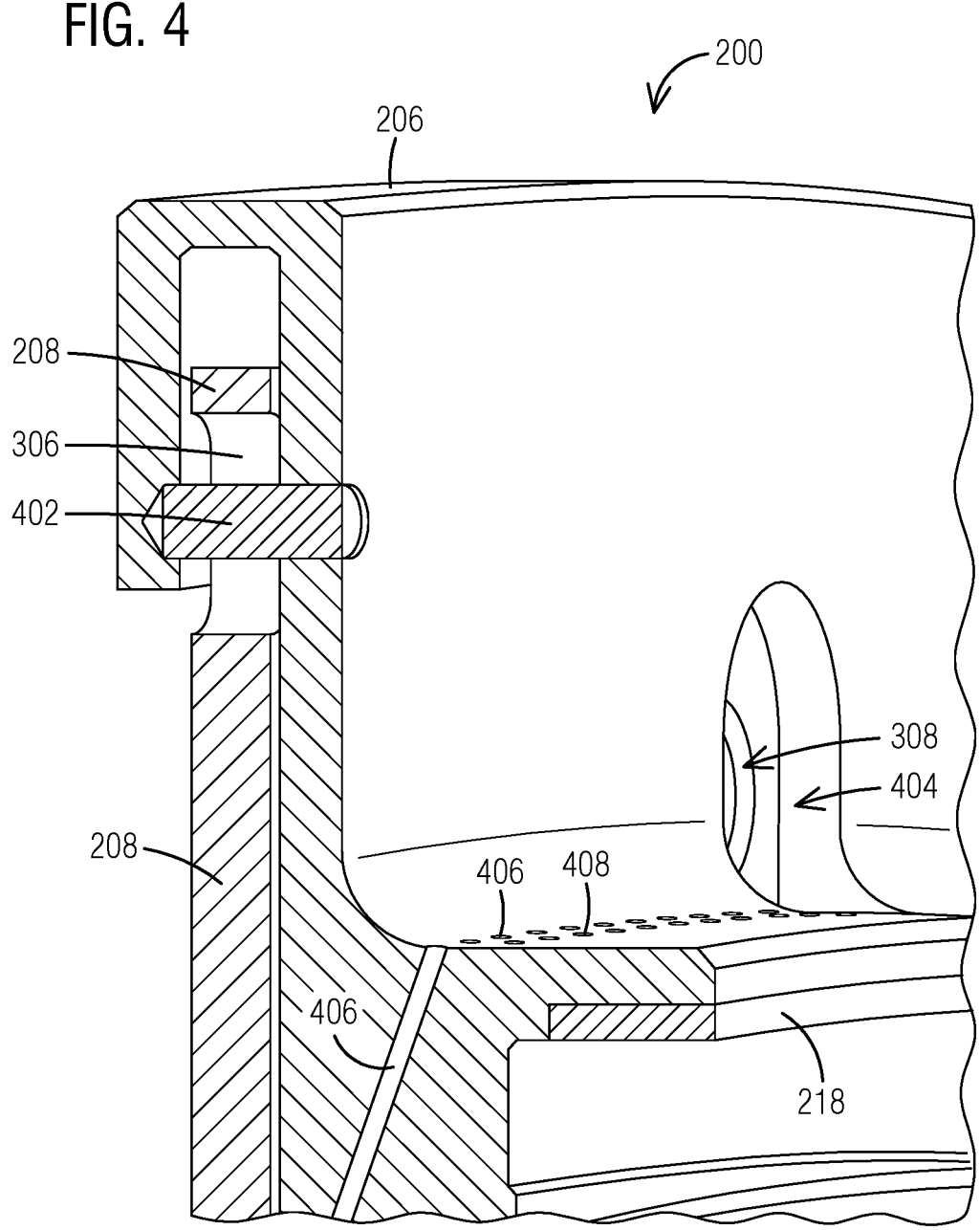
FIG. 4 illustrates a cross sectional partial perspective view of a sealing interface secured with an anti-rotation pin.

FIG. 4 illustrates a partial cross-sectional perspective view of the sealing interface 200. The sealing interface 200 includes an anti-rotation pin 402 extending through the slot 306 in the flat bracket 208. The slot 306 allows for radial movement of the anti-rotation pin 402 along the slot 306. The anti-rotation pin 402 restricts the floating seal 206 from circumferential movement. The floating seal 206 includes a cutout portion, or U-shaped channel 210, to allow the relative radial movement of the anti-rotation pin 402 of the floating seal 206 within the slot 306.

FIG. 4 also illustrates an embodiment where the floating seal 206 includes a plurality of access bores 404 formed in the body portion of the floating seal 206. The plurality of access bores 404 are positioned to mate up with a plurality of corresponding bolt holes 308 in the flat bracket 208. The plurality of access bores 404 are aligned with a corresponding bolt in a corresponding bolt hole 308 attaching the flat bracket 208 to the outlet exit surface 202 to allow the bolts to be installed through the access bores 404. The access bores 404 may be oval shaped and are large enough that the bolt head does not come into contact with the floating seal 206. Two rows of cooling passages, an upstream row of cooling passages 406 and a downstream row of cooling passages 408 may be positioned in the body portion of the floating seal 206.

Figure 5:
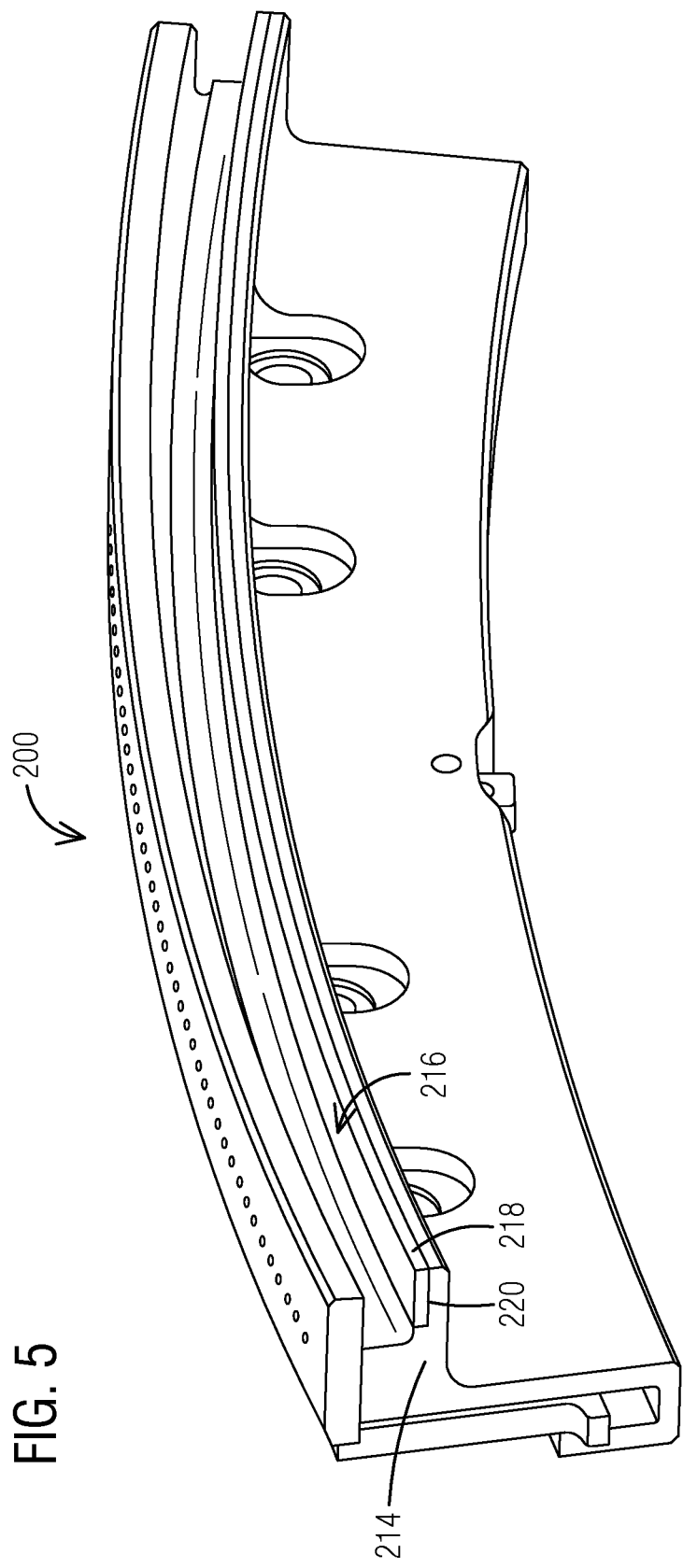
FIG. 5 illustrates a perspective view of the sealing interface having an attached wear strip.

FIG. 5 illustrates a perspective view of the sealing interface 200 having a wear strip 218 attached to a contact face 220 of the U-shaped downstream portion 214. In an embodiment, the downstream portion 214 includes the contact face 220, the contact face 220 including the wear strip 218 and extends circumferentially along the downstream portion 214. The wear strip 218 is attached to the contact face 220 by brazing, for example, however other methods of attachment are also possible. In an embodiment, the wear strip 218 may comprise a cobalt-chromium alloy. In particular, the cobalt-chromium alloy may be Stellite 6B®.

FIG. 6 illustrates a top view of the floating seal 206 while FIG. 7 illustrates a bottom view of the floating seal 206. The floating seal 206 includes a first cylindrical surface 602, a second cylindrical surface 606 and a frustoconical surface 604. The floating seal 206 also includes two rows of cooling passages. Each cooling passage of an upstream row of cooling passages 406 extends on an oblique angle, with respect to the first cylindrical surface 602, and includes an outlet hole in the frustoconical surface 604. A cross section of a cooling passage of the upstream row of cooling passages 406 may be seen in FIG. 4. Each cooling passage of a downstream row of cooling passages 408 extends normally to the first cylindrical surface 602 and includes an outlet hole in a second cylindrical surface 606. The upstream row of cooling passages 406 and the downstream row of cooling passages 408 allow a cooling air flow from the compressor section of the engine to cool the sealing interface 200 throughout the floating seal 206 and on a hot combustion gas side of the sealing interface 200.

Figure 8:
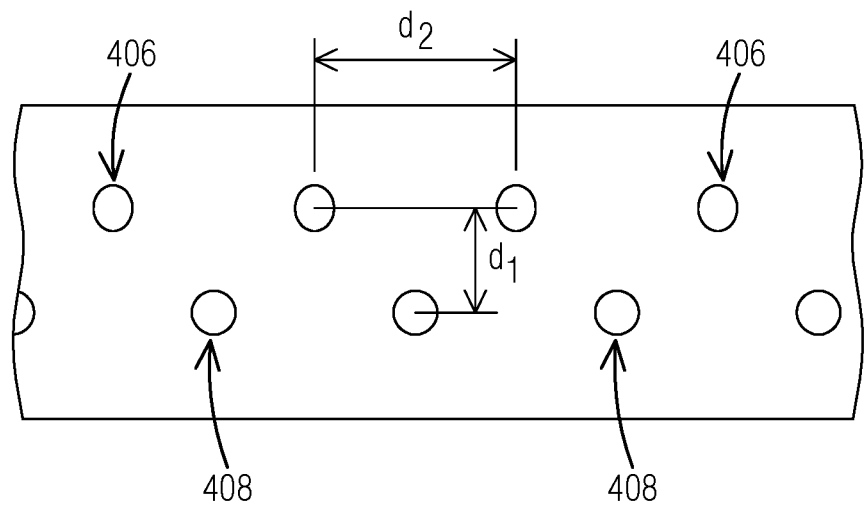
FIG. 8 illustrates a top zoomed in view of the floating seal having two rows of cooling passages.

In an embodiment, the upstream row of cooling passages 406 is staggered circumferentially with respect to the downstream row of cooling passages 408 such that none of the cooling passages from the upstream row of cooling passages 406 is axially aligned with the cooling passages of the downstream row of cooling passages 408. The staggered arrangement may be seen in FIG. 8. A distance ($d_1$) between the rows 406, 408 may be between 2-3 mm, for example. A distance ($d_2$) between the cooling passages 406, 408 in each row may be between 5-6 mm, for example.

Figure 9:
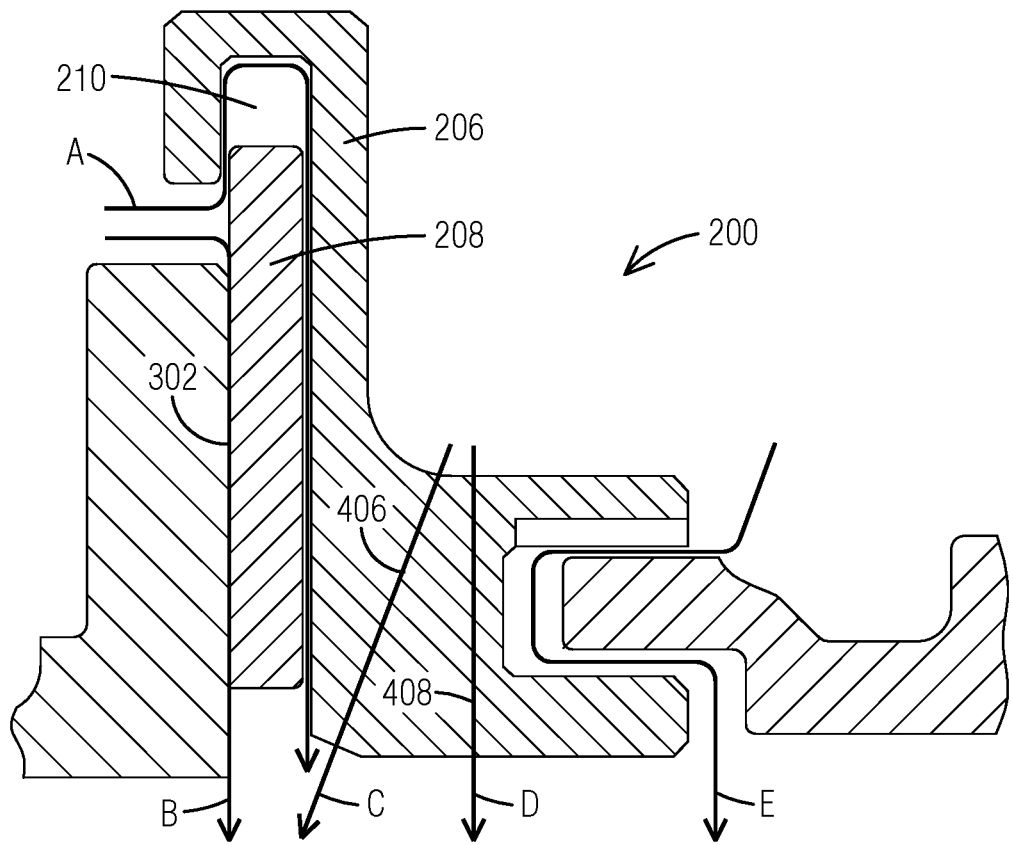
FIG. 9 illustrates a cross sectional view of the sealing interface with cooling flows.

FIG. 9 illustrates a cross sectional view of the sealing interface 200 with the cooling flows shown through the floating seal 206 and along the flat bracket 208/outlet exit surface 202 interface. A cooler fluid flow originating from the compressor section of the engine may be used (flow shown by the arrows) to cool the floating seal 206 and the outlet exit surface 202. However, as the sealing interface 200 is used to limit the compressed air, as may be fluidly coupled to the transition shell, from mixing with the combustion gases, a limited amount of cooling flow is permitted. Cooling through the cooling channels 302 is represented by cooling flow B. Cooling through the upstream row of cooling passages 406 may be seen by cooling flow C and cooling through the downstream rows of cooling passages 408 may be seen by cooling flow D. Cooling flows A and E represent leakage flows through the sealing interface 200 into the combustion gas flow F (shown in FIG. 1). The proposed design of the sealing interface 200 with the cooling passages 302, 606, and 608 meet thresholds for leakage flow through the sealing interface 200.

The proposed sealing interface allows the newer design of the transition duct to mate with existing first stage turbine vane structures already in the field such that the sealing interface is retrofittable. In addition, the proposed solution is cost effective as it allows the transition duct the versatility of being mated to more than one style of first stage turbine vane structures while continuing to provide consistent sealing performance. The sealing interface also introduces cooling features for cooling the interface itself and the adjoining transition.

What is claimed is:

1. A sealing assembly positioned between a first component having a first interface and a second component having a second interface, the seal assembly comprising:
    a flat bracket fixedly attached to the first interface to define an extension; and
    a floating seal including a body portion, a first U-shaped channel arranged to engage the extension, and a second U-shaped channel normal to the first U-shaped channel arranged to engage the second interface, the first U-shaped channel inhibiting movement of the floating seal in an axial direction while allowing movement in a radial direction, and the second U-shaped channel allowing movement in the axial direction and inhibiting movement in the radial direction,
    wherein the body portion defines a cylindrical surface and a frustoconical surface, and wherein a first row of cooling passages include first outlet holes formed in the frustoconical surface and a second row of cooling passages include second outlet holes formed in the cylindrical surface,
    wherein the second row of cooling passages extend normal to the cylindrical surface and wherein the first row of cooling passages extend at an oblique angle with respect to the cylindrical surface, and
    wherein the first row of cooling passages is staggered circumferentially with respect to the second row of cooling passages such that none of the first outlet holes are axially aligned with the second outlet holes.

2. The sealing assembly of claim 1, wherein the flat bracket includes a first planar face that abuts the first interface, a second planar face, and a plurality of radially extending cooling channels formed in the first planar face.

3. The sealing assembly of claim 1, wherein the flat bracket includes a plurality of contact tabs for contacting the floating seal.

4. The sealing assembly of claim 1, further comprising an anti-rotation pin and a slot formed in the flat bracket, the anti-rotation pin positioned at least par-tially within the slot to inhibit the floating seal from circumferential movement.

5. The sealing assembly of claim 1, wherein the first component is a transition component of a gas turbine engine and the second component is a first stage turbine vane of the gas turbine engine, and wherein the second U-shaped channel engages an upstream lip of the first stage turbine vane.

6. The sealing assembly of claim 5, wherein the second U-shaped channel defines a groove in the body portion and wherein the groove includes a contact face including a wear strip attached to the contact face.

7. The sealing assembly of claim 6, wherein the wear strip comprises a cobalt-chromium alloy.

8. The sealing assembly of claim 1, further comprising a plurality of access bores formed in the body portion, and a plurality of bolts arranged to attach the flat bracket to the first interface, each access bore aligned with one of the plurality of bolts to allow installation of the plurality of bolts through the floating seal.

9. The sealing assembly of claim 1, wherein a thickness of the flat bracket is in a range of 6 mm to 25 mm.

* * * * *